C. THOMAS.
AUXILIARY TIRE CARRIER.
APPLICATION FILED NOV. 25, 1916.

1,319,125. Patented Oct. 21, 1919.

INVENTOR
Cyril Thomas.
PER
H·M·STEELY Jr.
ATTORNEY.

UNITED STATES PATENT OFFICE.

CYRIL THOMAS, OF DANVILLE, ILLINOIS.

AUXILIARY TIRE-CARRIER.

1,319,125.          Specification of Letters Patent.        Patented Oct. 21, 1919.

Application filed November 25, 1916. Serial No. 133,445.

*To all whom it may concern:*

Be it known that I, CYRIL THOMAS, a citizen of the United States, residing at Danville, in the county of Vermillion and State of Illinois, have invented certain new and useful Improvements in Auxiliary Tire-Carriers, of which the following is a specification, reference being had to the accompanying drawings.

This invention relates to certain improvements in auxiliary tire carriers and it is an object of the invention to provide a novel and improved device of this general character whereby a second extra tire may be readily and conveniently carried by an automobile body.

It is also an object of the invention to provide a novel and improved device of this general character which may be readily and conveniently thrown into an inoperative position, as the occasion may require.

The invention consists in the details of construction and in the combination and arrangement of the several parts of my improved auxiliary tire carrier whereby certain important advantages are attained and the device is rendered simpler, less expensive and otherwise more convenient and advantageous for use, as will be hereinafter more fully set forth.

The novel features of my invention will hereinafter be definitely claimed.

Figure 1:
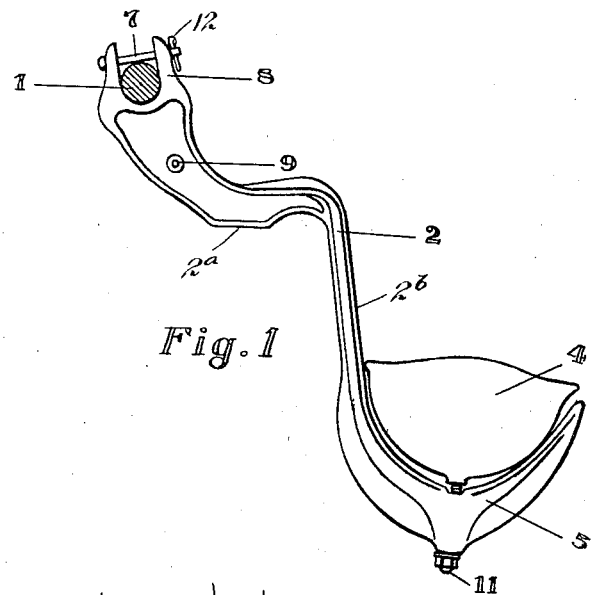
Figure 2:
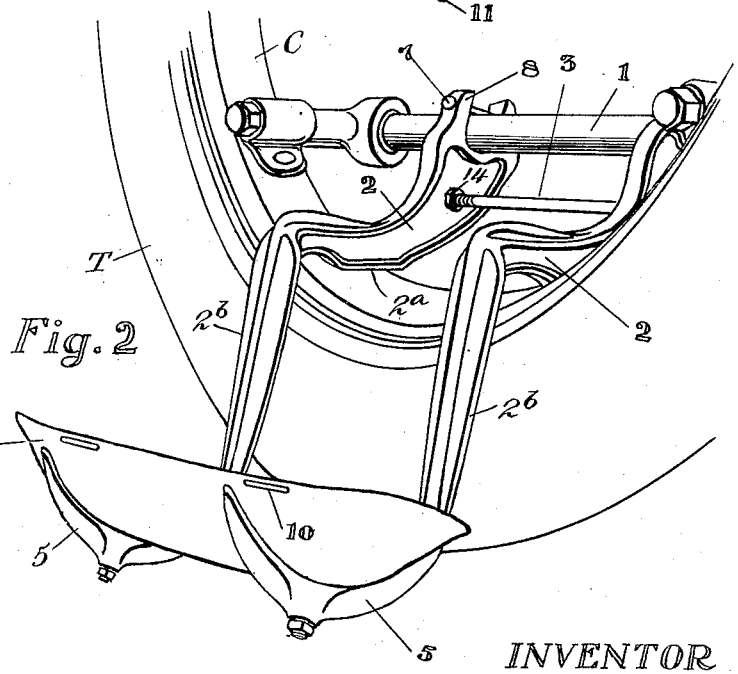

In order that my invention may be the better understood I will now proceed to describe the same with reference to the accompanying drawings, wherein:

Figure 1 is a view in side elevation with certain of the parts in section and certain of the parts omitted of an auxiliary tire carrier constructed in accordance with an embodiment of my invention; and Fig. 2 is a view in perspective of my improved tire carrier as herein disclosed.

As disclosed in the accompanying drawings C denotes a type of carrier well known to the trade and which is supported by the rod or brace extending between the side members of an automobile chassis or body. My improved tire carrier is particularly adapted for use in connection with the carrier C so that a convenient means is provided for carrying a second extra or auxiliary tire.

As herein embodied my improved carrier comprises two side members 2 in predetermined spaced relation and of duplicate construction. The upper end portion of each of the members 2 is bifurcated to afford a fork 8 adapted to straddle the rod 1 and disposed through the free extremities of the arms of the fork 8 is a headed pin 7 held in applied position through the medium of a cotter pin 12 or the like disposed through the free end portion of the pin 7 as is particularly illustrated in Fig. 1. By this arrangement it will be at once self-evident that the arm 2 has swinging engagement with the rod 1 so that the same may be swung upwardly when it is desired to remove the auxiliary tire mounted upon the carrier C. The end portion of the arm 2 provided with the fork 8 is arranged on a predetermined curvature and is continued by the straight portion $2^a$ which is adapted to rest in substantially horizontal position upon the inner face of the carrier C. The straight portion $2^a$ is followed by the angularly disposed portion $2^b$ extending downwardly when the arm is in operative position and which is arranged on such an inclination relative to the straight portion $2^a$ to permit the portion $2^b$ to overlie the tire T arranged upon the carrier C. It is preferred that the portion $2^b$ of the arm 2 be flattened to afford a broad surface so that the second spare or auxiliary tire will be supported in close proximity to the tire T. The free extremity of the portion $2^b$ of the arm 2 is formed to afford an inwardly facing hook member 5 which is adapted to snugly receive an end portion of a cradle 4. The cradle 4 is secured to the hook member 5 preferably through the medium of a flat head bolt 11 passing through the bottom of the cradle and the central portion of the hook member 5.

Each of the arms 2 adjacent the fork 8 is provided with an opening 9 through which is disposed an end portion of the rod 3. The rod 3 is secured to each of the arms 2 through the medium of locking nuts 14 threaded upon the rod 3 at each side of the arm 2 and contacting with said arm. By this arrangement the rod 3 serves to maintain the adjacent end portions of the arms 2 in fixed separated relation.

Each of the free longitudinal marginal portions of the cradle 4 is provided with the spaced slots or openings 10 through which straps or the like are adapted to pass for holding in applied position a tire positioned upon the cradle 4. The cradle 4 is of such configuration as to snugly receive a standard automobile tire. After the tire supported by the cradle 4 has been removed if it should be desired to remove the tire T it is only necessary to swing the arms 2 upwardly. When the cradle 4 is in its upper position no obstruction or hindrance is offered to the removal of the tire T.

From the foregoing description, it is thought to be obvious that an auxiliary tire carrier constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

The combination with a tire carrier and a rod extending thereacross; of an auxiliary tire carrier comprising spaced arms provided at their upper ends with forks to straddle the rod, pins coacting with the forks for holding the arms to the rod, the intermediate portions of the arms being angularly disposed to afford surfaces to rest upon the carrier, a tire receiving cradle carried by the opposite end portions of the arms and serving to maintain said end portions of the arms in predetermined spaced relation, and means connecting the upper end portions of the arms for maintaining the same in desired spaced relation.

CYRIL THOMAS.

Copies of this patent may be obtained for five cents each, by addressing the "Commissioner of Patents, Washington, D. C."